United States Patent [19]

Whitley

[11] Patent Number: 4,697,406
[45] Date of Patent: Oct. 6, 1987

[54] HARVESTER FOR VINE TYPE CROPS

[76] Inventor: Andrew Whitley, Rte. 5, Box 360, Zebulon, N.C. 27597

[21] Appl. No.: 837,141

[22] Filed: Mar. 7, 1986

[51] Int. Cl.[4] ............................................. A01D 46/00
[52] U.S. Cl. .................................. 56/327 R; 56/16.5; 56/14.5
[58] Field of Search ............... 56/327 R, 328 R, 16.5, 56/14.5, 14.6, 157; 171/5, 14, 26, 31, 83

[56] References Cited

U.S. PATENT DOCUMENTS

| 3,600,882 | 8/1971 | Eisenberg | 56/327 R |
| 4,402,175 | 9/1983 | Watenpaugh | 56/327 R |
| 4,594,842 | 6/1986 | Wolters et al. | 56/14.5 |

FOREIGN PATENT DOCUMENTS

| 752190 | 7/1956 | United Kingdom | 171/5 |
| 481259 | 10/1975 | U.S.S.R. | 56/327 R |

Primary Examiner—Robert Peshock
Assistant Examiner—John G. Weiss
Attorney, Agent, or Firm—Mills & Coats

[57] ABSTRACT

This invention is a vegetable harvester which gets below the vines, picks the vegetables from such vines, and conveys the picked vegetables away from the harvest area for grading and other processing. This is accomplished through the provision of a pair of disc shaped picker heads which separate the vegetables from their vines and moves the same to a point adjacent a conveyor where they are deposited for conveyance.

5 Claims, 2 Drawing Figures

HARVESTER FOR VINE TYPE CROPS

FIELD OF INVENTION

This invention relates to agricultural equipment and more particularly to harvesters for the fruit of vine type plants.

BACKGROUND OF INVENTION

The harvestering of the fruit of vine type plants such as cucumbers, peppers, squash, and the like have always been difficult due to the fact that the vines and their associated crop to be harvested lie close to the ground. To hand pick such crops is a laborious, back breaking task requiring a great amount of field labor during the harvest season which, due to various conditions, can be a relatively short period of time.

To somewhat alleviate the above mentioned problems, apparatuses have been developed to allow the pickers to ride on low slung seats thus reducing the bending over required by hand labor and greatly increasing the productivity of the pickers. The products being harvested, however, are still being picked by hand which still makes the harvest labor intensive.

BRIEF DESCRIPTION OF INVENTION

After much research and study into the above-mentioned problems, the present invention has been developed to provide a mechanical harvester for low lying, vine type crops which will not only separate the product from its associated vine, but will convey the same away from the harvest area for processing.

The above is accomplished through the provision of a pair of rotating harvester heads which engage the vegetable being harvested, sever the same from its associated vine, and deposit the same on an adjacent conveyor for removal from the harvest area.

In addition to the above, vine cutters can be provided outboard of the harvester or picker head to prevent excessive tangling of vines during the harvestering operation.

In view of the above, it is an object of the present invention to provide a mechanical harvester for vine type crops.

Another object of the present invention is to provide a harvester for vegetables which sever such vegetables from their associated vines and conveys the same for further processing.

Another object of the present invention is to provide a rotating carousel picker head used in association with vine type vegetable crops.

Another object of the present invention is to provide a pair of rotating carousel vegetable picking heads for harvestering crops from vine type plants and for conveying the same to a remote location for further processing.

Another object of the present invention is to provide a rotating harvester head having a plurality of stem cutting edges and a plurality of harvested product transfer means whereby the crop being harvested can be severed from its supporting vines, moved to a point adjacent a conveyor and deposit it on such conveyor for packing or other processing.

Other objects and advantages of the present invention will become apparent and obvious from study of the following description and the accompanying drawings which are merely illustrative of such invention.

DETAILED DESCRIPTION OF INVENTION

Figure 1:
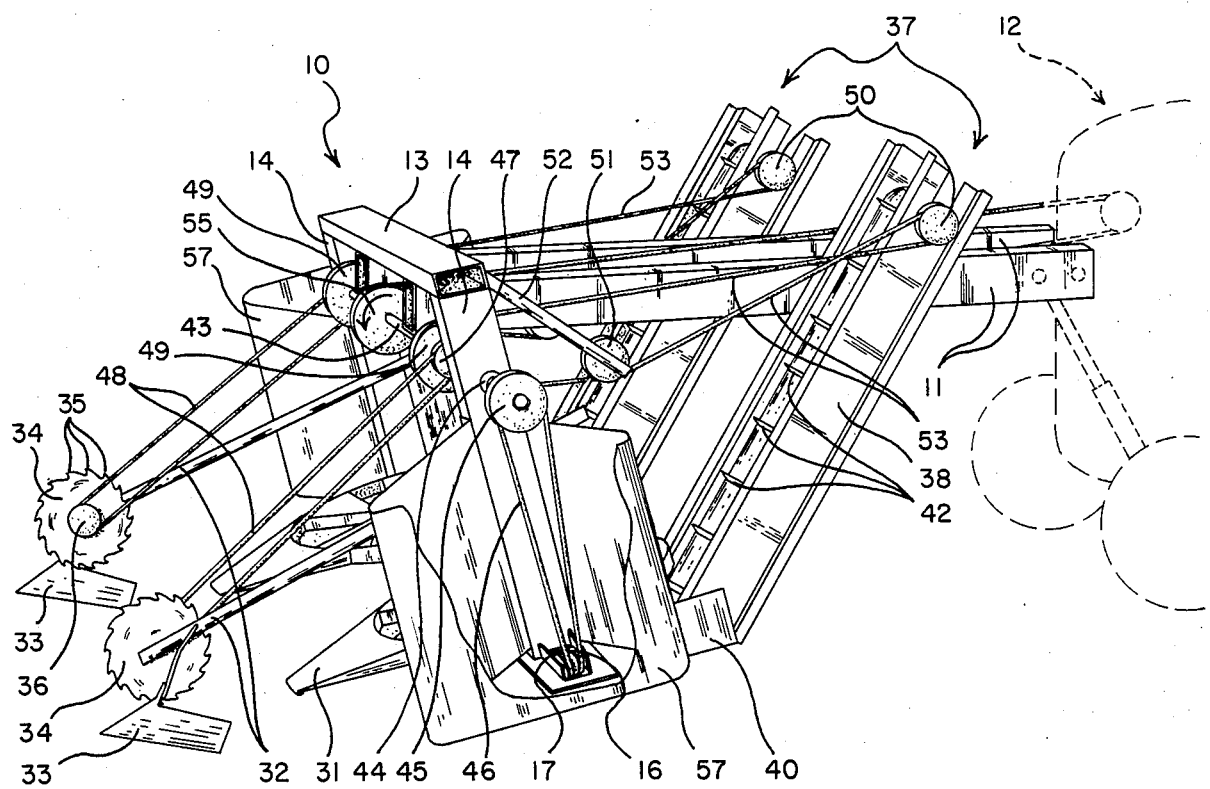
FIG. 1 is a side perspective view of the harvester of the present invention.

With further reference to the drawings, the harvester for vine type crops, indicated generally at 10, includes a pair of support frames 11 which are adjustably mounted on a tractor or other support and drive means indicated at 12. Since tractors and similar agricultural equipment support means are well known to those skilled in the art, further detailed discussion of the same is not deemed necessary.

A generally U-shaped main frame 13 having downwardly disposed leg portions 14 is provided. Said main frame 13 is fixedly secured to support frame 11 by weldment or other suitable means. Fixedly secured to the lower ends of each of the leg portions 14 is a harvester head support 15.

A pair of sheaves 16 and 17 are rotatively mounted on shaft 18 which in turn is fixedly secured to the outer end of head support 15.

The inner end of head support 15 rotatively mounts, through bearing 19, a vertical shaft 20. This vertical shaft has a sheave 21 fixedly mounted on the lower end thereof with the carousel portion 22 of the harvester head 23 fixedly mounted on the upper end thereof.

The carousel portion 22 of harvester head 23 includes a plurality of outwardly radiating harvester plates 24. Each of these plates includes a forward knife edge 25 for severing the vines of the crop and a trailing, downwardly projecting conveyor paddle 26 for moving the crop from the point of severing to the conveyor opening as will hereinafter be described in greater detail.

A peripheral collar 27 interconnects each of the harvester plates 24 and gives rigidity to the carousel portion 22 of the harvest head 23.

The bottom portion 28 of harvester head 23 includes a relatively flat, circular bottom member 29 fixedly mounted on the inner end of head support 15. An upwardly projecting lip 30 is provided about the periphery of bottom member 29 just outside of the collar 27 of carousel portion 22 as can clearly be seen in the Figures. A forwardly and slightly downwardly projecting, somewhat V-shaped vine scoop 31 is fixedly secured to each of the bottom portions 28 by weldment or other suitable means.

Fixedly secured to, and forwardly and downwardly projecting from each of the leg portions 14 is a cutter support bracket 32. On the outer end of each of the support brackets 32 is a plow shaped vine lifter 33. Rotatively mounted on support bracket 32 immediately behind vine lifter 33 is a cutter blade 34 which includes sharpened cutting teeth 35. A sheave 36 is fixedly secured to blade 34 to drive the same as will hereinafter be described in greater detail.

Crop conveyors, indicated generally at 37, include a pair of parallely disposed frames 38 with an endless conveyor 39 operatively mounted therebetween. Conveyor 37 is mounted on head support 15 by lower conveyor mounting bracket 40 and to adjacent support frame 11 by upper conveyor mounting bracket 41.

Conveyor belt 39 includes a plurality of outwardly projecting flanges for evenly moving the crop along the conveyor. Since crop conveyors of the type shown and described are well known to those skilled in the art, further detailed discussion of the same is not deemed necessary.

A tranversely disposed main drive shaft 43 extends through both leg portions 14 of main frame 13 and is rotatively supported by means such as bearings 44. On the outer ends of drive shaft 43 are fixedly secured harvester head drive sheaves 45. A head drive belt 46 is trained over the drive sheaves 45, about the two turning sheaves 16 and 17, and vertical shaft sheave 21 as can clearly be seen in FIG. 2. Thus it can be seen that when shaft 43 is turned, through turning sheaves 16 and 17 and shaft mounted sheave 21, vertical shaft 20 with its associated carousel portion will be driven.

Just inside each of the leg portions 14 is a sheave 47 fixedly secured to drive shaft 43. A belt 48 is trained over each of the sheaves 47 and their aligned cutter drive sheave 46 so that when main drive shaft 43 is rotatively driven, cutter blades 34 will be driven adjacent their respective vine lifters 33.

Interiorly of cutter blade drive sheaves 47 are conveyor drive sheaves 49 which are fixedly secured to drive shaft 43. These last mentioned sheaves are in operative alignment with the sheaves 50 used to propel the conveyor belts 39 of crop conveyors 37.

Idler or tension sheaves 51 are rotatively mounted on the outer ends of idler support arms 52 which in turn are pivotively mounted to main frame 13. Since idler or tensioning sheaves mounted on pivoted supports are well known to those skilled in the art, further detailed discussion of the same is not deemed necessary.

Conveyor drive belts 53 are trained about conveyor drive sheave 49, their aligned conveyor sheaves 50, and tension sheaves 51 to drive crop conveyor 37.

The main drive shaft 43 is rotatively driven by main drive belt 54 which receives its power from support and drive means 12. Since belt drive means are well known to those skilled in the art, further detailed discussion of the same is not deemed necessary.

Figure 2:
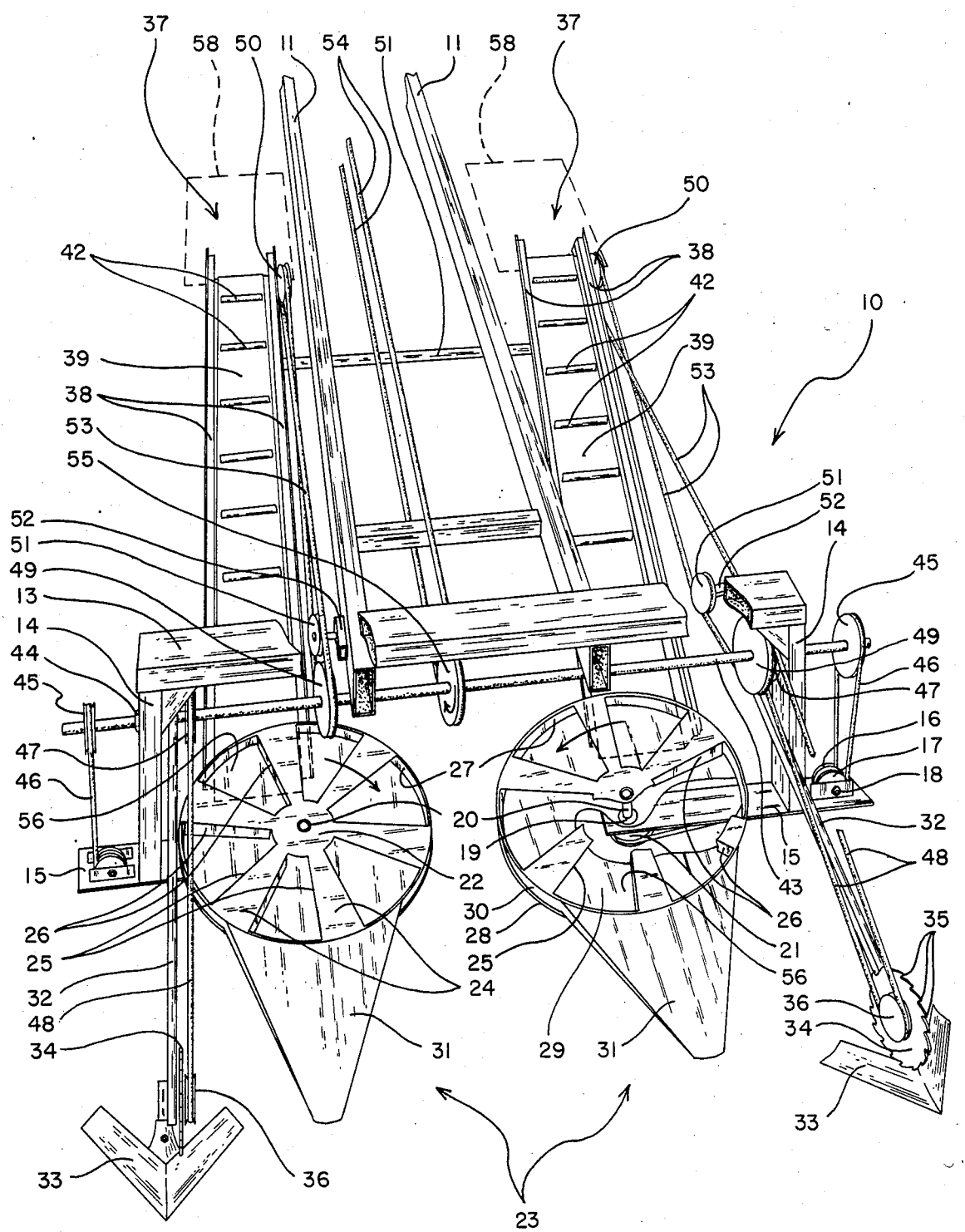
FIG. 2 is a front perspective view thereof.

Each bottom member 29 includes an opening 56 disposed immediately above conveyor belt 39 as can clearly be seen in FIG. 2.

A vine guard 57 is mounted on each of the leg portions 14 of main frame 13. These guards prevent drive belt 46 and its associated sheaves 16 and 17 from becoming choked with vines during the harvestering process.

To use the harvester of the present invention, the same is operatively mounted on the support and drive means 12 and moved to a point adjacent the crop with the harvester heads 23 disposed on either side of the row. The support frames 11 are then adjusted upwardly or downwardly so that the vine lifters 33 and the vine scoops 31 are disposed slightly above but adjacent the ground.

The support and drive means 12 then applies power to main drive belt 54 which in turn rotates main drive shaft 43, through main drive sheave 55 in the direction of the arrow shown in FIG. 1.

From drive shaft 43, conveyor drive belts 53 cause conveyor belt 39 to move upwardly and rearwardly from a point below opening 56 of harvester head 23 to containers, conveyors or other suitable means indicated at 58.

Shives 47 mounted on shaft 43 drive cutter belts 48 which in turn drives cutter blades 34 downwardly and rearwardly adjacent respective vine lifters 33. Thus as the harvester of the present invention moves down either side of the vine type row crop being harvested, the vines from the row are cut in a line just outside of the harvester heads to make the vines being harvested shorter and to prevent the same from becoming entangled in the harvester.

The vine scoops 31 of the harvester heads 23 get under the vines being harvested and lift the same, along with the vegetables attached to such vines, into the area of the carousel portion 22 thereof. This carousel portion is rotating in the direction indicated by the arrows in FIG. 2. As the harvester plates 24 engage the vegetables, the ripe ones are severed from the vines and moved by the carousel to the area of opening 56 where the same fall onto conveyor 39. The conveyor 39 then conveys the vegetables rearwardly and upwardly and deposits the same in the receiving means 58.

Since only ripe crops are usually separated from their vines, the immature or unripe crops are pulled by their associated vines across the harvester head 23 and are laid back beside the row to wait for the next run of the harvester. It has been found through extensive field testing that two to three runs of the harvester through the field during the harvest season will harvest a majority of the crop without harvestering green or immature products.

From the above it can be seen that the present invention has the advantage of providing a relatively simple, inexpensive, and yet highly efficient means of harvestering vine type crops which will pick a majority of the ripe products while allowing the immature products to remain on the vine for later harvestering. The present invention also has the advantage of being adaptable to a number of different types of support and drive means thus adding even more to its versatility.

The terms "upper", "lower", "top", "bottom", "lateral" and so forth have been used herein merely for convenience to describe the harvester and its parts as oriented in the drawings. It is to be understood, however, that these terms are in no way limiting to the invention since it may obviously be disposed in different orientations when in use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A harvester for vine type crops comprising: at least one harvester head; said harvester head including a rotatable carousel portion having a plurality of crop engaging openings therein for engaging and separating the crop from the vines, one edge of each said opening serving as a cutting edge for severing the crop from the vine, said carousel portion further including a conveyor paddle adjacent each said opening for moving the harvested crop to a central point for gathering; means for supportingly moving said harvester head adjacent said vine type crops; means for rotatingly driving said carousel portion to separate the crops from the vines; and means for gathering the harvested crop whereby an improved harvester is provided.

2. The harvester of claim 1 wherein at least one vine cutter means are operatively disposed adjacent said harvester head whereby excessive build up of vines on said harvester head can be prevented.

3. The harvester of claim 1 wherein the means for rotatively driving said carousel portion is a belt type drive.

4. The harvester of claim 1 wherein the means for gathering the harvested crop is a conveyor type means.

5. The harvester of claim 4 wherein the conveyor means is of the belt type.

* * * * *